(12) United States Patent
Tsai

(10) Patent No.: US 7,962,031 B2
(45) Date of Patent: Jun. 14, 2011

(54) PULSED CONTROL OF CAMERA FLASH

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/574,605

(22) Filed: Oct. 6, 2009

(65) Prior Publication Data

US 2011/0081142 A1   Apr. 7, 2011

(51) Int. Cl.
G03B 9/70   (2006.01)

(52) U.S. Cl. ........................................................ 396/173

(58) Field of Classification Search .................... 396/173
See application file for complete search history.

(56) References Cited

U.S. PATENT DOCUMENTS

| | | | |
|---|---|---|---|
| 7,171,113 B2* | 1/2007 | Parulski et al. ................ | 396/287 |
| 7,580,620 B2 | 8/2009 | Raskar | |
| 7,755,672 B2* | 7/2010 | Pertsel ........................ | 348/224.1 |
| 2007/0258707 A1 | 11/2007 | Raskar | |
| 2008/0101786 A1* | 5/2008 | Pozniansky et al. .......... | 396/159 |
| 2009/0160944 A1 | 6/2009 | Trevelyan et al. | |
| 2009/0244300 A1* | 10/2009 | Levin et al. ................. | 348/208.5 |
| 2009/0268041 A1* | 10/2009 | Chou et al. .................. | 348/208.6 |
| 2010/0188704 A1* | 7/2010 | Hoarau et al. ................ | 358/1.16 |

OTHER PUBLICATIONS

LEDs Magazine, Articles: Implementing LED Flash in Camera Phones, Apr. 2005, URL: http://www.ledsmagazine.com/features/2/4/1/1, (4 pages).

"Luxeon Flash for Cell Phone Camera, PDA and DSC Applications", Lumileds, Reference Design DR01, Feb. 2005, (6 pages).

"Wireless Flash Article", Updated Aug. 2006, Minolta's Wireless Flash, URL: http://www.friedmanarchives.com/flash.htm, (16 pages).

Raskar, Ramesh, et al., "Coded Exposure Photography: Motion Deblurring Using Fluttered Shutter", Mitsubishi Electric Research Labs (MERL), SIGGRAPH 2006, Cambridge, MA, URL: http://www.merl.com/people/raskar/deblur, (10 pages), Oct. 5, 2009.

Raskar, Ramesh, "Computational Photography", Microsoft PowerPoint presentation, Mitsubishi Electric Research Labs, Modified: Monday, Jun. 26, 2006 11:47p.m., Cambridge, MA, URL: http://www.Merl.com/people/raskar/ photo, (37 pages).

Williams, Jim, et al., "Simple Circuitry for Cellular Telephone/Camera Flash Illumination", A Practical Guide for Successfully Implementing Flashlamps, Linear Technology, Application Note 95 (AN95-1), Mar. 2004, (12 pages).

* cited by examiner

*Primary Examiner* — Rodney E Fuller
(74) *Attorney, Agent, or Firm* — Blakely, Sokoloff, Taylor & Zafman LLP

(57) ABSTRACT

Input from a user is received, to take a picture. A camera flash is signaled to produce multiple flash pulses during a single shutter cycle of the picture. The amplitudes of at least two of the flash pulses are different relative to each other. The picture is stored, including in its metadata information that describes the variable amplitude of the flash pulses that illuminated the scene when taking the picture. The information describing the variable amplitude of the flash pulses is used to deblur the picture. Other embodiments are also described and claimed.

24 Claims, 4 Drawing Sheets

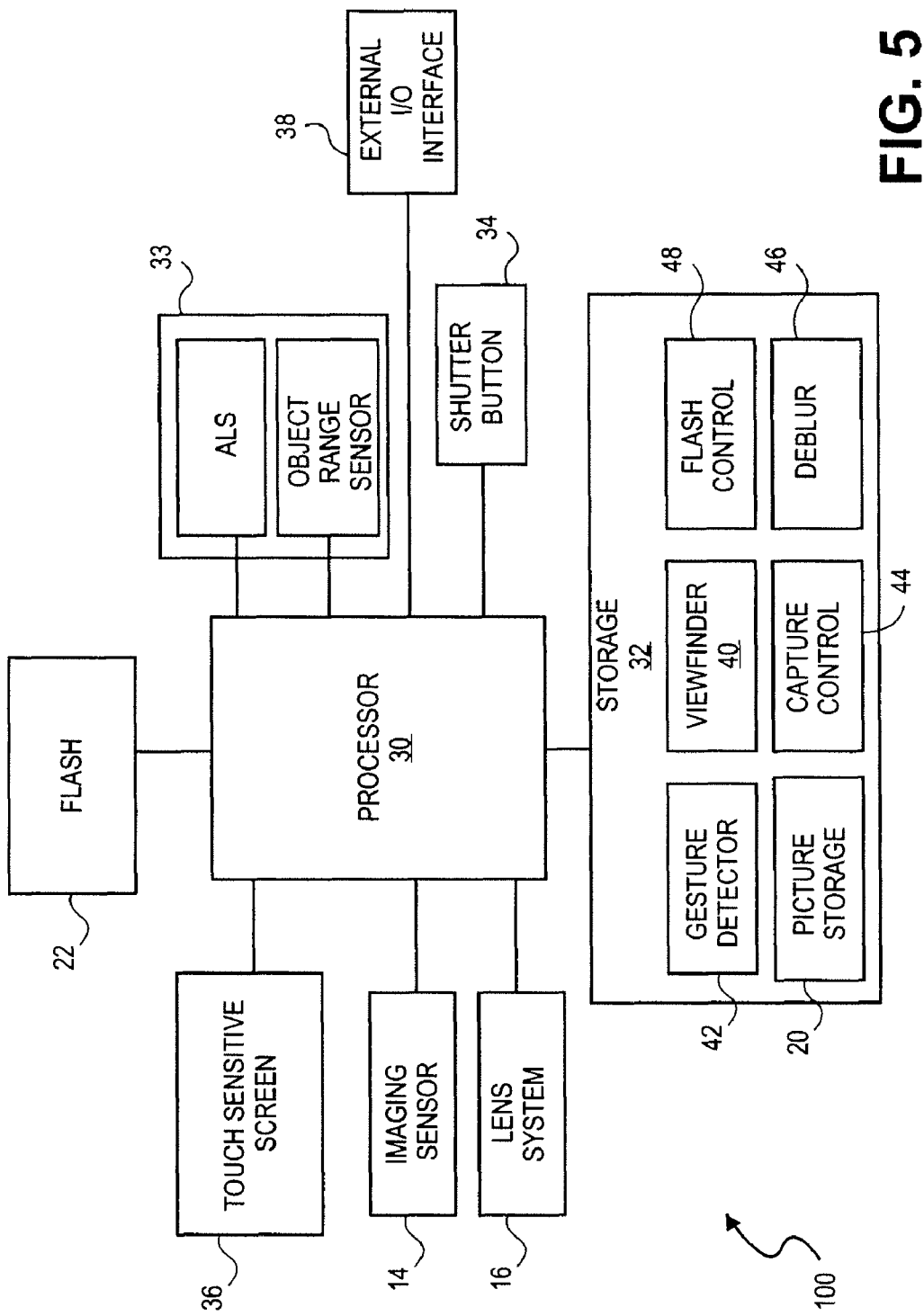

PULSED CONTROL OF CAMERA FLASH

An embodiment of the invention relates generally to electronic devices having a camera function (referred to here as an electronic camera device), and more particularly to techniques for controlling the camera flash. Other embodiments are also described.

BACKGROUND

In photography, a conventional camera flash is used to improve image picture quality in low light situations, by illuminating the scene with a burst of visible light while a picture of the scene is taken. For portable devices, such as handheld dedicated digital cameras and multifunction devices referred to as smart phones, the practical choices for an integrated, flash light source include the use of light emitting diodes (LEDs) and gas discharge lamps. An LED flash can be used to provide continuous illumination, which provides good illumination for capturing a rapid sequence of images, such as a video sequence. A gas discharge flash is typically operated in a pulsed manner to provide a very high intensity light but for a relatively short duration, no longer than the period of time the shutter is allowed to remain open to capture the scene for a single picture or frame. It is some times desirable to provide a less intense flash, e.g. during a redeye reduction process where the main flash is immediately proceeded by one or more reduced intensity flashes.

Illumination by flash is provided during the image-framing period (also referred to as the single shutter cycle for taking a picture). A typical range for such a period is 200-300 milliseconds. Some LED flashes are not capable of providing their highest level of illumination for the entire image framing period, and thus have to be pulsed with, for example, one larger pulse and one smaller pulse during the entire shutter cycle. There may also be thermal reasons for pulsing an LED flash.

In other aspects of photography, it is known that a moving object in the scene, or movement of the camera relative to an object in the scene, causes motion blur. In other words, the object appears blurred in the picture. Shortening the exposure time for taking the picture may reduce such blur, provided the image sensor is sensitive enough to capture a sufficient amount of light from the scene during the shorter exposure time. In another technique known as deblurring, a signal processing operation known as deconvolution can be applied to the picture in order to recover the high frequency or edge details that have been lost in the blurred picture. It has been reported that for an improved deblur operation, rather than leaving the shutter open continuously for the entire exposure duration, the camera shutter is "fluttered", i.e. opened and closed rapidly during a single exposure period, in accordance with a binary pseudo-random sequence or code. This flutter effectively changes the inherent filtering effect of the exposure time, in a way that better preserves the high frequency spatial or edge details in the picture, such that the subsequent deconvolution (deblurring) operation can be more easily performed to recover the edge information in the picture. This so-called coded exposure photography technique or flutter shutter technique has been suggested as being extendable to strobe lighting flashes. This coded flash sequence has been suggested to provide a greater ability to control motion sensing.

SUMMARY

An embodiment of the invention is an electronic device having a camera function for taking a picture, where a controller is to command a camera flash to produce two or more multi-value coded pulses of light during a single shutter cycle of the picture. As redefined here, the term "camera flash" is not limited to elements that produce only visible light pulses; the camera flash can also, or alternatively, produce non-visible light pulses that can be reflected from moving objects in the scene and then detected by an imaging sensor (as a picture of the scene with the moving object). The pulses are said to be "multi-value coded" in that the amplitudes of at least two of the flash pulses are non-zero and different relative to each other. This variation in the flash pulses inherently embeds useful information into the picture about the motion of an object, which in turn provides an effective mechanism to subsequently deblur the picture (using stored knowledge of the timing and variable amplitude characteristics of the variable flash pulses). The mechanism is also applicable in the case of video compression, to perform motion compensation across several frames of video. Having the amplitude of the flash pulses be variable yields an improved ability to subsequently discriminate the high frequency or edge components of the picture, during the subsequent deblurring or motion compensation operation.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5 is a more detailed block diagram of an electronic device having a camera function.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
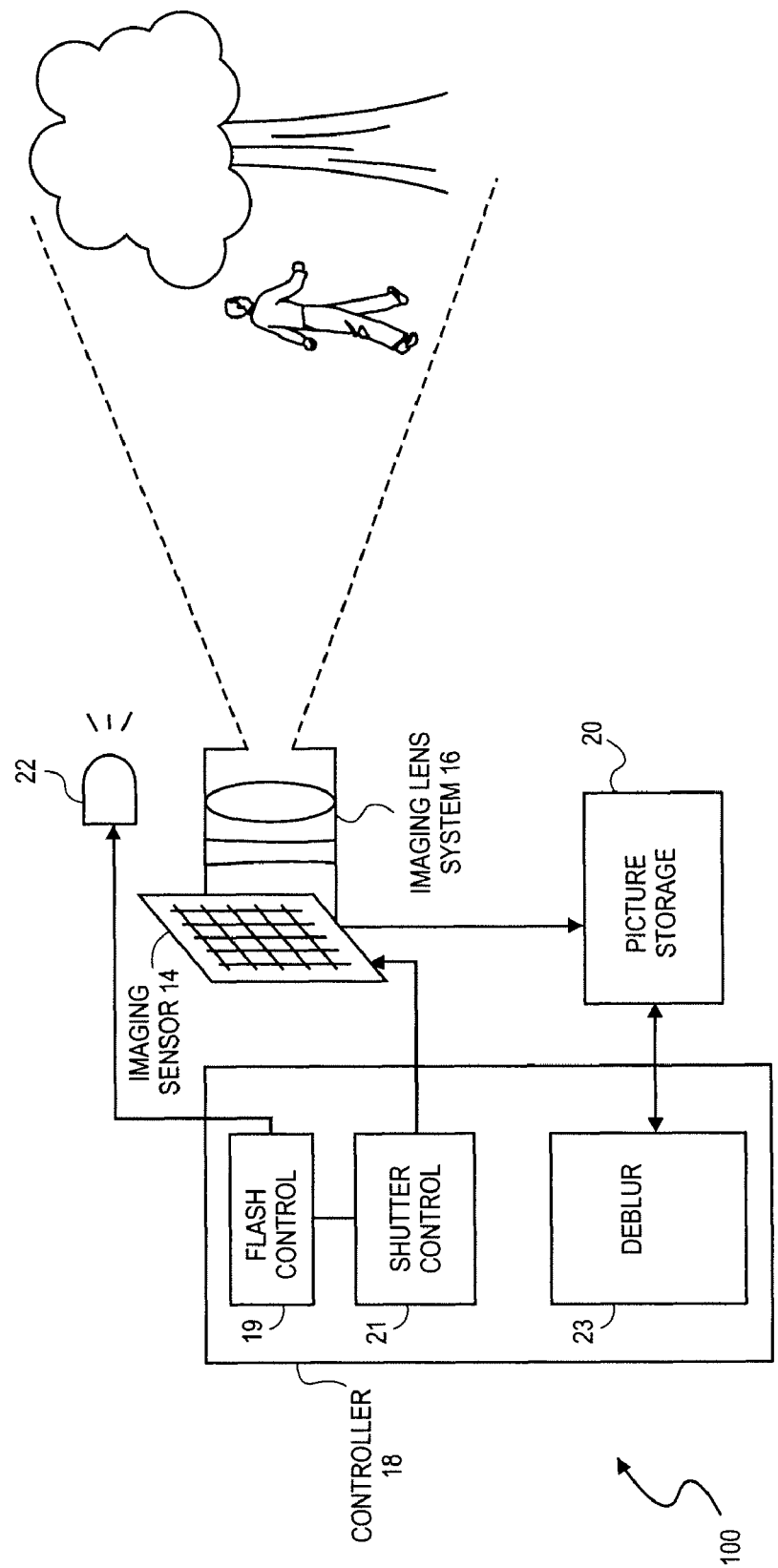
FIG. 1 is a block diagram of an electronic device having a camera function.

FIG. 1 is a block diagram of an electronic device 100 having a camera function or camera, in accordance with an embodiment of the invention. The device 100 may be a portable device, such as a dedicated digital still or video camera, a smart phone or laptop/notebook computer with an integrated camera function, or it may be a desktop personal computer with a built-in camera function. In this example, the device 100 is shown as being aimed at a scene in which there is a person walking in front of a tree. In the context of the embodiments of the invention, there is expected to be substantial movement of an object in the scene relative to the electronic device 100. Thus, the camera may be essentially fixed and aimed at a moving object, or it may be moving relative to an essentially fixed object (e.g., a smart phone with a camera that is typically susceptible to movement while being held in its user's hands). Such relative movement causes a blurred picture, which may be ameliorated using one or more of the embodiments described below.

The components depicted in FIG. 1 may all be integrated within a single main housing or case that makes up the device 100. These components include an imaging sensor 14 that captures pictures of the scene. The imaging sensor 14 may be a solid state or integrated circuit device that implements an array of visible light and/or non-visible (e.g., infrared) light sensor elements, and associated analog and digital signal processing and exposure control circuitry. Examples include a complementary metal oxide semiconductor (CMOS) or a charge coupled device (CCD) imaging sensor chip that is used in typical consumer grade digital still and video cameras, and in smart phones that have camera functionality.

The imaging sensor 14 has electronic shutter capability that is controlled by shutter control 21. Control signals provided to the imaging sensor 14 include pixel array reset signals and row or column readout signals, timed in accordance with a desired exposure time or integration time for taking the picture. The shutter control 21 may also be capable of controlling the image sensor 14 so as to capture a rapid sequence of pictures or frames, i.e. video of the scene. For either still or video, a shutter cycle may be loosely defined as the process of the electronic shutter opening, closing, and resetting to where it is ready to open again. Although described in the terms of an electronic shutter, where the imaging sensor 14 is a solid state sensor that is capable of electronically resetting itself in preparation for integration or detection of incident light, the discussion is also applicable to digital cameras that have only mechanical shutters or to those that use a combination of mechanical shutter and solid-state imaging sensor reset circuitry.

The device 100 also includes picture storage 20, for example, in the form of any suitable combination of solid-state memory (e.g., dynamic random access memory, non-volatile solid state memory, or other suitable storage for digital images). The storage 20 may be used to store the picture that is taken of the scene, as well as any interim images that might be captured in the picture taking process.

Coupled to the imaging sensor 14 is an imaging lens system 16, which is to be aimed at the scene being captured. The imaging lens system 16 may include one or more lenses to focus light from the scene onto a focal plane at which the imaging sensor 14 may be located, to form a visible light and/or an infrared light image of the scene. Other elements may be included in the lens system 16, such as a variable or fixed aperture, a variable focus or zoom lens, and one or more light filters, all of which may be in accordance with conventional digital camera technology.

The device 100 also has an integrated flash 22 that is also to be aimed at the scene. One or more light source elements together with associated optics may be present in the flash 22, each of which can produce a strobe of light or, in the case of video capture, continuous light for a longer duration, to illuminate the scene (while the pictures are being taken at the same time). A light source element may be an electrically powered gas discharge tube, such as a xenon tube, an infrared transmitter, or it may be more recently developed technology such as a visible and/or infrared LED lamp that can be easily operated in a pulsed manner within a typical, single shutter cycle (e.g., 200-300 msec), as described here. The flash 22 may have multiple LED lamps each of which may be driven by a different pulse sequence (during the single exposure time interval). The flash 22 controlled in this manner thus allows the picture to be taken without decreasing the exposure time, thereby capturing a sharper picture even while there may be some relative movement between the device 100 and the object in the scene being illuminated. Associated with the flash 22 is flash control 19.

The flash control 19, which may be implemented by hardwired circuitry or a combination of hardwired circuitry and a programmed processor, provides the needed control signals for operating or controlling the flash 22 in a multi-value coded pulsed manner i.e., more than two distinct, non-zero amplitudes for the light pulses. The flash control 19 can signal the camera flash 22 to produce multiple flash pulses during a single shutter cycle of a picture, where the amplitudes of at least two of the flash pulses are different relative to each other. Commanding of the flash 22 should be coordinated with the timing of the shutter so that the desired flash pulses are produced within the desired single shutter cycle of a picture. The concepts of timing and amplitude for purposes of defining the flash pulses will be further elaborated below in connection with FIG. 2.

Figure 3:
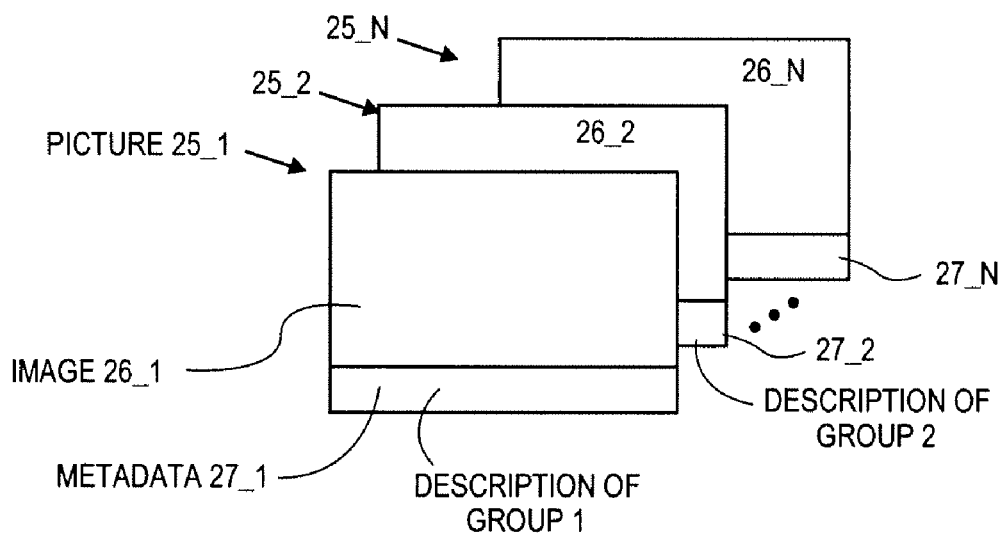
FIG. 3 depicts a number of pictures that can be taken by the camera function where each picture has its associated metadata containing flash information describing the timing and amplitude variation of the multi-value coded flash pulse sequence used when taking the respective picture.

Once one or more pictures have been taken by the imaging sensor 14, in the presence of flash pulses commanded by the flash control 19 in conjunction with shutter control 21, the pictures may be stored in the picture storage 20. This is performed by a controller 18, which can be viewed as also including the functionality of all of the other three components—flash control 19, shutter control 21, and deblur block 23. In addition to the image content of a picture, information that describes the flash pulses that were used when taking the picture are also written to the picture storage 20 by the controller 18, as part of metadata of the respective picture. Thus, referring briefly to FIG. 3 where N pictures which may be either still images or a sequence of frames of video are depicted, each picture 25 includes an image 26 and associated metadata 27. In other words, the image 26 has been tagged with metadata 27 that defines the timing and amplitude of the flash pulses used when taking the picture 25.

Once the picture 25 is available within picture storage 20, the deblur block 23 can access the metadata 27 of the picture 25, and perform a deblur operation upon the picture 25. This is done using information in the accessed metadata 27, which describes the flash pulses that occurred when the picture 25 was first taken. The deblur operation may, in principle, be somewhat similar to the deblur operation that has been described by other workers previously as including a deconvolution operation for a fluttered shutter technique (also referred to as coded exposure photography). The following deblur procedure can be performed to compute an estimate of an original or "unblurred" image:

Using the equation $A*X=B$

Where A is the estimated blur operator (matrix)
B is the taken picture (blurred) and
X is the unblurred picture (to be solved for)
1) Compute pixel size of blurred area ("blur size") by e.g. estimating motion of an object in the taken picture B;

2) Compute object size, by fine-tuning from the blur size a suitable window that contains the object;
3) Compute A which is the estimated blur operator for the foreground (object) that is blurred, using the stored information on the timing and amplitude variation of flash pulses and using the computed object size; and
4) Compute $X = A^{-1} * B$, e.g. using a least squares error algorithm or other suitable statistical estimation algorithm.

Figure 2:
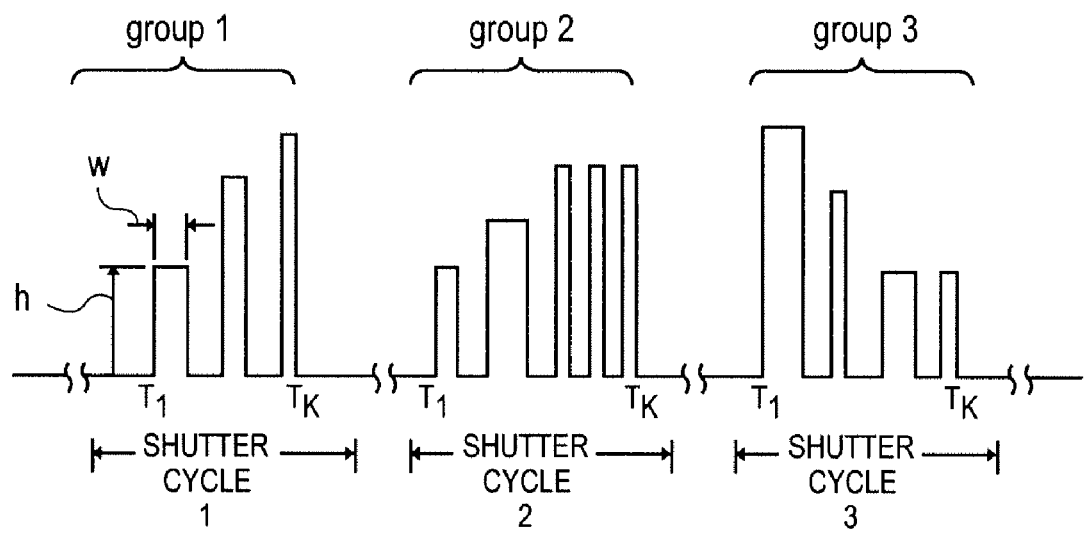
FIG. 2 shows a number of groups or sets of flash pulses illustrating variable timing and amplitude, in accordance with an embodiment of the invention.

Turning now to FIG. 2, a number of groups or sets of flash pulses illustrating variable timing and amplitude, in accordance with an embodiment of the invention, are shown. Each group of pulses occurs during its respective, single shutter cycle (here, three cycles are given as an example). A pulse may be defined by its width w (e.g., a fraction of a second) and its amplitude h (e.g., light intensity; electrical current). A shutter cycle may be viewed as the process of the shutter opening, closing, and resetting to where it is ready to open again. The shutter may be a purely electronic mechanism or it may be a combination where an electronic reset prepares the imaging sensor for light integration and a mechanical shutter is applied to close or end the cycle (just prior to electronic readout of the captured image). The flash pulses here can be viewed as the "main flash" in a single exposure or integration time interval—for a single picture or photograph. Thus, any red-eye reduction flash pulses would precede the main flash.

Still referring to FIG. 2, it can be seen that each shutter cycle has at least two flash pulses, where in this case both timing and amplitude of at least two of the flash pulses are different relative to each other. For example, for a set of three or more flash pulses, the amplitudes h of at least two of the flash pulses are different. This is referred to as a variable amplitude, or multi-value coded, flash pulse sequence. For example, in contrast to the following binary sequence [111000011100001100001001], in which the flash is either on ("1") or off ("0"), a normalized multi-value flash sequence is used instead, e.g. [0.1, 0.8, 0.4, 0.9, . . . ] where the first pulse has a normalized intensity or power level of 0.1, the second 0.8, the third 0.4, etc. Note that as explained above, in addition to variable amplitude, certain aspects of the timing of the flash pulse sequences can also be variable.

Timing in the context of a single shutter cycle refers to pulse width, w. In the examples of FIG. 2, the pulse widths of at least two of the flash pulses in the single shutter cycle are different relative to each other. This is referred to as variable timing. In another embodiment of variable timing, both the timing and amplitude characteristics of one set of two or more flash pulses (as a whole) in a given single shutter cycle are different than those of another shutter cycle. Timing in this context (between two or more shutter cycles) may refer to not just the width w of any single pulse, but also the start $T_1$ of the initial pulse in the set, the end $T_K$ of the last pulse in the set, or the separation between two adjacent pulses in the set. Thus, using FIG. 2 as an example, it can be seen that the start of the initial pulse ($T_1$) in shutter cycle 1 is delayed relative to the same metric in shutter cycle 2. Also, the separation between the last two pulses in shutter cycle 2 is shorter than the same metric in shutter cycle 1.

In another embodiment, both the timing and amplitude of the flash pulses in one shutter cycle can be varied randomly, relative to those of another. Random here means "sufficiently random" to produce the needed variation in the captured image, for purposes of subsequently de-blurring the image. Thus, a pseudo-random variation may in practice be sufficient. This randomization refers to either the pulse amplitudes, or to both the pulse amplitudes and the pulse timing, i.e. the pulse widths, and/or pulse separations, in a sequence of two or more pulses for one image capture, as being different in a random sense than those for another image capture (by the same camera function).

The variation in the flash pulse timing and amplitude may be predetermined at the factory and then fixed, for implementation in the field, i.e. in the usual course of an end user or consumer using the device 100. Several possible timing and amplitude patterns may be generated and then configured into the flash control 19 (see FIG. 1). It is also possible to allow the flash control 19 to select among these fixed patterns randomly, in the field. As another alternative, the flash pulse timing and amplitude patterns may be programmable in the field, rather than fixed in advance, so that the flash control 19 can generate and apply its own random pattern to each picture.

In most cases, the particular flash pulse pattern to be used for taking a given picture is selected based on detecting scene conditions, such as lighting and object motion, during a pre-exposure time interval (e.g., while the user has depressed and is holding a physical shutter button part of the way, or has not yet removed her finger off a virtual shutter button).

When a picture is taken, the controller 18 writes, to the storage 20, information that describes the timing and amplitude of the flash pulses as part of metadata of the picture. Thus, referring to FIG. 3, where N pictures that may be either still images or a sequence of frames of video are depicted, each picture 25 includes an image 26 and associated metadata 27. In other words, the image 26 has been tagged with metadata 27 that defines the timing and amplitude of the flash pulses used when taking the picture 25.

Assuming the varied flash pulse sequence described above was strong enough to dominate illumination of the scene, information that reflects or contains the relative motion between an object in the scene and the device 100 has now been captured by the image 26. This information which is inherently embedded in the image 26 is then used, in conjunction with the timing and amplitude definitions in the associated metadata 27, by the image-processing deblur block 23, to in effect reconstruct the details including edges of moving objects in the scene.

Figure 4:
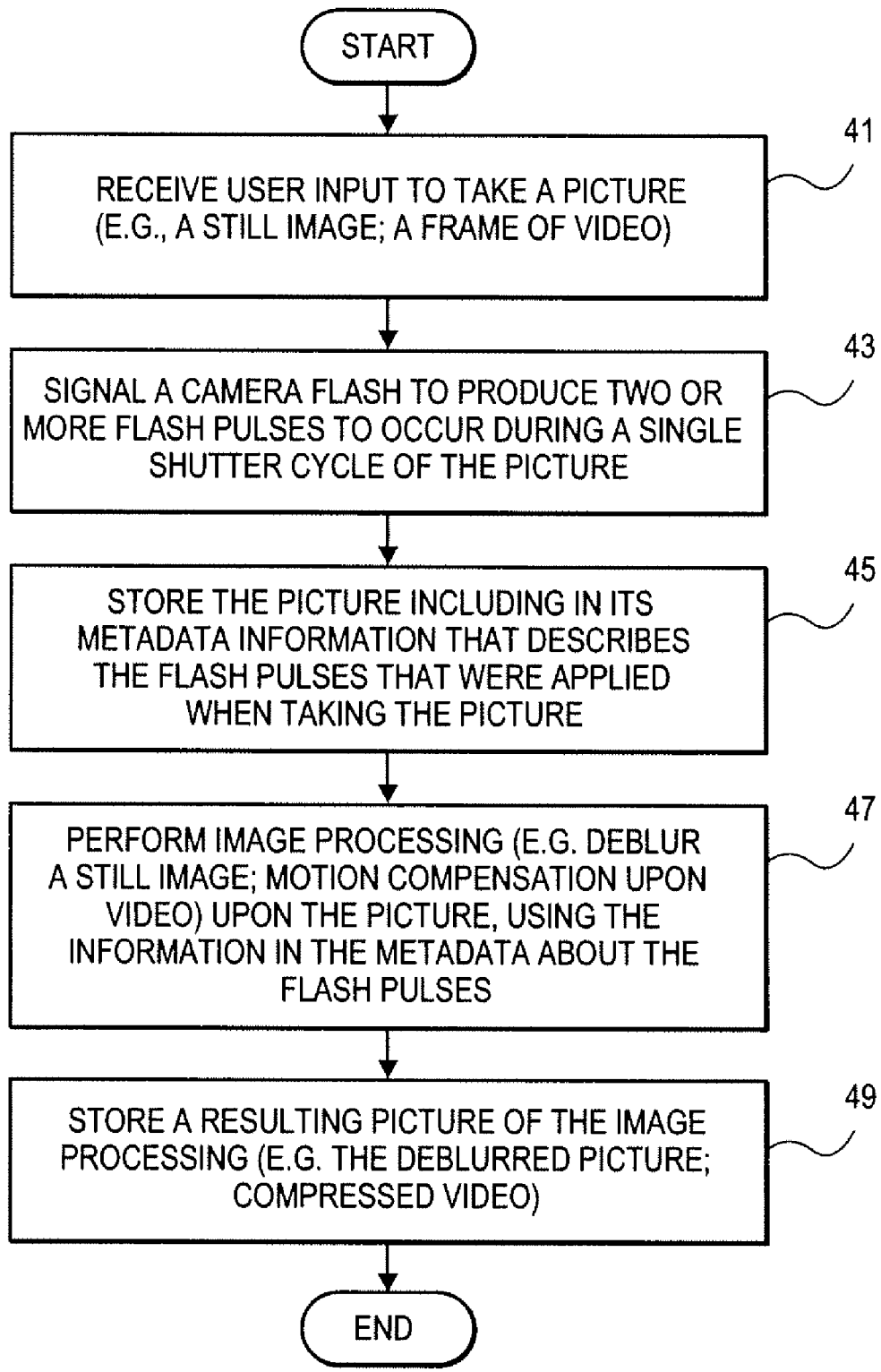
FIG. 4 is a flow diagram of operations performed by the electronic camera device to yield improved picture quality, in accordance with an embodiment of the invention.

FIG. 4 is a flow diagram of a computerized method for taking and processing a picture using a camera flash to yield improved picture quality, in accordance with an embodiment of the invention. The operations of the method may be performed by the device 100, and in particular by the controller 18 described above. After the device 100 has been turned on or a camera application program has been launched, and the camera function is ready to take pictures, user input is received take a picture (block 41). The picture may be a single still image (still capture mode), or it may be a single frame of video (video capture mode). User input may be in the form of a signal from a physical or virtual shutter button implemented in the device 100, e.g. a pre-exposure signal triggered by the user having pressed the physical button only part of the way or having initially touched the virtual button.

At this point, the camera function may detect scene conditions such as lighting and object motion (e.g., direction and speed of the object), based on which it may then determine the appropriate lens focus position (e.g., a zoom lens), exposure time and the need for a visible flash. The decision to apply the visible flash may be a manual one by the user or it may be automatic using conventional scene lighting analysis techniques. The camera function then selects the appropriate flash pulse sequence (e.g., based on the lighting and based on object speed findings) and signals the camera flash to produce two or more flash pulses, timed so that they occur during the single shutter cycle of the picture and in accordance with variable amplitude as described above (block 43).

Once the picture has been taken, it may be stored as an electronic file in the device 100, together with its tagged metadata information (block 45). The latter describes the flash pulses that were applied when taking the picture, including their timing and variable amplitude. This may be achieved by encoding (into the metadata) the individual flash pulse timing and amplitude values directly. Alternatively, a number of different timing and amplitude patterns may be defined where each is represented by a respective short code or symbol, and it is only this code or symbol which is encoded into the metadata. There may be other ways of encoding the characteristics of the flash pulses into the metadata of each picture file.

Image processing may then be performed upon the stored picture file, using the information in its metadata about the flash pulses (block 47). This may be a deblur operation that is based on image deconvolution, applied to a still image or to a single frame of video, or it may be a motion compensation operation applied to video (e.g., as part of a video compression process). In both cases, information describing the timing and variable amplitude of the flash pulses is used in the image processing operation to more easily recover edge information or detect objects. Finally, a resulting picture file of the image processing (e.g., a deblurred still or video file; a compressed video file) is then stored in the device 100.

FIG. 5 is a more detailed block diagram of some of the hardware and program functional units that may be integrated within the device 100, in accordance with an embodiment of the invention. Beginning with the management or high-level functions, these may be performed by a processor 30 executing program code or instructions (also referred to as program modules) that are stored or encoded in storage 32. The processor 30 may include any suitable combination of programmable logical or data processing circuitry to execute the program modules described below. Such circuitry may be selected from the following example group of integrated circuit devices: an applications processor such as one that is integrated in a typical multi function portable device such as a smart phone, a central processing unit (CPU) such as found in a dedicated portable digital camera or laptop personal computer, and a dedicated camera digital signal processor (DSP) chip. The storage 32 includes machine-readable media that may include one or more of various types of data storage media, depending upon the particular type of device 100, e.g. fixed volatile and non-volatile memory such as random access memory, removable non-volatile storage such as a flash memory card, and kinetic mass storage such as an optical or magnetic rotating disk drive. The storage 32 contains several program modules that implement the various camera functions described above, as well as some others to be discussed further below.

The camera functionality of the device 100 may be obtained by the following combination of components working with each other, some of which have been described above in connection with FIG. 1: imaging sensor 14, imaging lens system 16, flash control module 48 (for implementing flash control 19), deblur module 46 (for implementing deblur block 23), capture control module 44 (for implementing shutter control 21), and picture storage 20. Many camera functions may be implemented by specially programming the processor 30 in accordance with the various program modules. These may include the capture control module 44, for managing various typical aspects of digital photography, including monitoring a shutter button 34, determining scene conditions using scene condition sensors 33 (including for example an ambient light sensor, ALS, and an object range and motion sensor), adjusting exposure settings and signaling a flash requirement for dimly lit scenes, digital image processing enhancements such white balance and color correction, and the transfer of the pictures to internal storage 20 or to an external device (e.g., a desktop computer, a printer, or a remote network node). The external transfer may be performed by an external I/O interface 38 which may be for a high speed serial bus such as one that complies with an Institute of Electrical and Electronics Engineers, IEEE, Standard 1349 or a Universal Serial Bus, USB, specification, a flash memory card, a wired local area network, LAN, such as Ethernet, a wireless LAN, or a short range or personal area network using a wireless link such as a Bluetooth link. There may also be an autofocus module (not shown) that performs a typical autofocus operation during the picture taking process, based on distance, proximity, and/or object tracking data that may be provided by an autofocus sensor (as part of the scene condition sensors 33).

Still referring to FIG. 5, this embodiment of the device 100 contains an integrated touch sensitive screen 36 working with the processor 30 which is programmed in accordance with a gesture detector module 42. That combination may be similar to one that is currently used in an iPhone™ smart phone or iPod Touch™ multi function portable device from Apple Inc., which allows the user to input her commands or selections by finger touching an icon or graphic of a virtual button that is being displayed on the touch screen 36. Some typical camera functions that can also be implemented in the touch screen 36 include the electronic viewfinder (implemented using the processor 30 programmed in accordance with a viewfinder module 40) and a virtual version of the shutter button 34. Other ways of implementing the camera functions described above in the device 100 are possible.

To conclude, various aspects of a technique for controlling pulsed operation of a camera flash has been described. As explained above, an embodiment of the invention may be a machine-readable medium having stored thereon instructions, which program one or more data processing components (generically referred to here as a "processor") to perform some of the operations described above. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the deblur block 23 (to improve sharpness of a picture using the timing and amplitude characteristics of the flash pulses), could be part of a video compression block (not shown), to help more easily detect motion of an object in a sequence of rapid pictures (video). Also, while the post capture image processing and storage operations of blocks 47 and 49 in FIG. 4 have been described as being performed by the device 100 itself (which contains the camera functions that perform the operations of blocks 41-45), these can alternatively be performed by an external device. For example, the picture files could be transferred from the device 100 to an external device such as a desktop computer, the latter then performing the post capture operations of blocks 47 and 49. The description is thus to be regarded as illustrative instead of limiting. Finally, although in many instances the flash pulses that are applied during the picture taking process (to embed additional information about motion in the scene into the image content of the picture) are visible light pulses, this is not necessary in all instances. For example, the flash pulses may be infrared light pulses, and an infrared-only or an infrared and visible imaging sensor could be used to take the picture. In that case, referring now to the equation A*X=B given above for computing the unblurred image X, while the blur operator A could be estimated in the same manner and using as B the infrared picture, the unblurred visible image X would be calculated using as B the visible picture (which would have been taken in the same single shutter cycle as the infrared picture). The description is thus to be regarded as illustrative instead of limiting.

What is claimed is:

1. An electronic device having a camera function comprising:
    a camera flash;
    storage; and
    a controller to command the camera flash to produce a plurality of sets of two or more flash pulses, each set to occur during a single shutter cycle of a respective one of a plurality of pictures, wherein the controller is to vary the timing and amplitude of the flash pulses in one set relative to those of another set, the controller to write to said storage information that describes the amplitude variation of the flash pulses as part of metadata of the picture.

2. The device of claim 1 wherein the controller comprises a programmed processor that defines each set as having a pulse width and a pulse amplitude that differ from those of another set.

3. The device of claim 1 wherein the controller comprises a programmed processor that defines each set as having a pulse separation and a pulse amplitude that differ from those of another set.

4. The device of claim 1 wherein the controller comprises a programmed processor that defines each set as having an initial pulse start time and a pulse amplitude that differ from those of another set.

5. The device of claim 1 wherein the controller comprises a programmed processor that defines each set as having a last pulse end time and a pulse amplitude that differ from those of another set.

6. The device of claim 1 wherein the controller comprises a programmed processor that defines each set as having a pulse width and a pulse amplitude that differ from those of another set.

7. The device of claim 1 wherein the controller is to access metadata of the pictures, and perform a deblur operation using information in the accessed metadata which describes the flash pulses that occurred when the pictures were taken.

8. An apparatus comprising:
    a portable electronic device having a camera function, the portable device having
        storage,
        a camera flash, and
        a controller to command the camera flash to produce a plurality of flash pulses, during a single shutter cycle for taking a picture, in accordance with timing and amplitude that has (1) one of at least two different pulse widths, pulse separations, initial pulse start times, and last pulse end times, and (2) at least two different pulse amplitudes the controller to write to the storage flash information as part of metadata of the picture, wherein the written flash information describes the amplitude variation of the plurality of flash pulses used for taking the picture.

9. The apparatus of claim 8 wherein the camera flash is to produce the plurality of flash pulses as visible light pulses and the controller is to access the written flash information and deblur the picture using the accessed flash information.

10. The apparatus of claim 8 wherein the controller is to command the camera flash to produce the plurality of flash pulses during each of a plurality of frames of video taken by the camera function, the controller to access the written flash information and perform motion compensation using the accessed flash information.

11. The apparatus of claim 8 wherein the timing and amplitude is fixed at the time of manufacture of the apparatus.

12. The apparatus of claim 8 wherein the timing and amplitude is programmable in the field.

13. The apparatus of claim 8 wherein the controller is to produce the plurality of flash pulses in accordance with random timing and amplitude.

14. A computerized method for using a camera flash, comprising:
    receiving input from a user to take a picture;
    signaling a camera flash to produce a plurality of flash pulses during a single shutter cycle of the picture, wherein the amplitudes of at least two of the flash pulses are different relative to each other;
    taking an infrared light picture the user input, during the single shutter cycle;
    taking a visible light picture in response to the user input, during the single shutter cycle; and
    storing the infrared and visible light pictures as a part of metadata information that describes the amplitude variation of the flash pulses that were applied when taking the pictures.

15. The method of claim 14, herein the flash pulses are infrared pulses, the method further comprising:
    accessing the flash pulse amplitude variation in the stored metadata;
    performing image processing upon the visible light picture using the accessed flash pulse amplitude variation; and
    storing a resulting picture the image processing.

16. The method of claim 15 wherein said performing the image processing comprises:
    performing a deblur operation upon the visible light picture using the accessed flash pulse amplitude variation.

17. The method of claim 15 wherein said performing the image processing comprises:
    performing a motion compensation operation upon the visible light picture as part of a video compression operation.

18. The method of claim 15 further comprising:
    computing a blur operator based on (1) a computed object size of an object detected in the infrared light picture and (2) the accessed flash pulse amplitude variation,
    and wherein said performing image processing upon the visible light picture comprises applying the blur operator to the visible light picture to compute the resulting picture.

19. An article of manufacture comprising:
    a machine-readable medium having stored therein instructions that program a computer system to access a stored picture, wherein the picture includes an image and tagged metadata, perform image processing upon the image by performing a motion compensation operation, as part of a video compression operation, using information in the metadata that describes the variable amplitude of flash pulses that illuminate the scene of which the picture was taken, and store a resulting picture of the image processing.

20. The article of manufacture of claim 19 wherein the instructions program the computer system to perform the image processing by performing a deblur operation upon the accessed image using the accessed metadata.

21. The article of manufacture of claim 19 wherein the instructions program the computer system to produce the flash pulses in accordance with timing and amplitude that has (1) one of at least two different pulse widths, pulse separations, initial pulse start times, and last pulse end times, and (2) at least two different pulse amplitudes.

22. The article of manufacture of claim 21 wherein the instructions contain the timing and amplitude which was fixed at the time of manufacture of the apparatus.

23. The article of manufacture of claim 21 wherein the instructions program the computer system so that the timing and amplitude is programmable in the field.

24. The article of manufacture of claim 21 wherein the instructions program the computer system to vary the timing and amplitude randomly.

* * * * *